Patented July 6, 1943

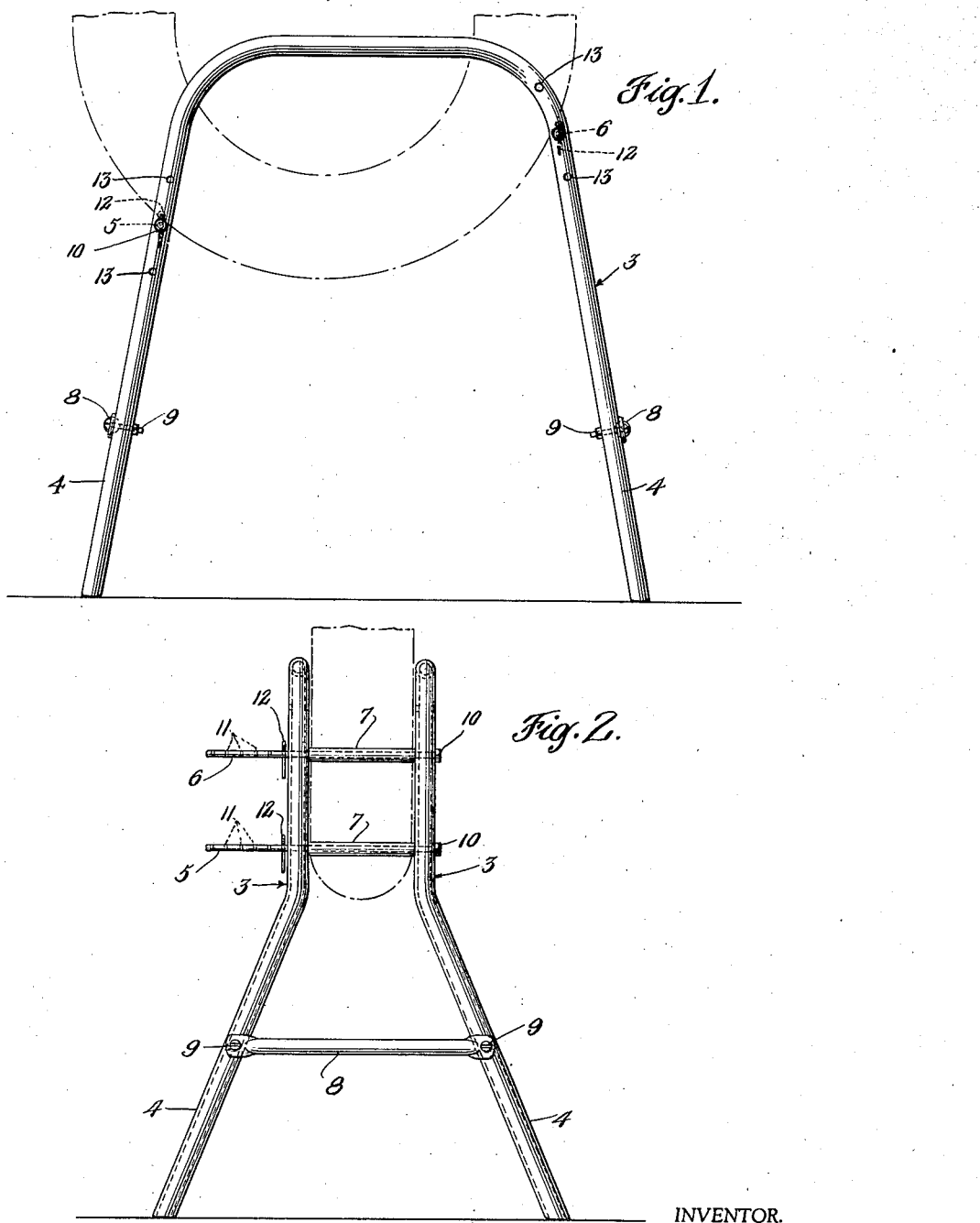

2,323,846

UNITED STATES PATENT OFFICE 2,323,846

TIRE SUPPORTING DEVICE

Homer Dever Saltsman, Philadelphia, Pa.

Application April 24, 1942, Serial No. 440,407

2 Claims. (Cl. 211—24)

This invention relates to a device for supporting tires in a simple and rugged manner for vulcanizing, grooving or like purposes.

The primary object of my invention is the provision of a supporting device of the above character which is simple in construction, inexpensive to manufacture, and easily assembled and disassembled.

Another object of my invention is the provision of a device for supporting tires to be worked upon, which provides stable support for the tire without the necessity of employing clamping or securing devices for holding the tire in place.

A further object resides in the provision of a device of the character described which may be readily adjusted to accommodate tires of different sizes.

How the foregoing, together with such other objects and advantages, as may hereinafter appear, or are incident to my invention, are realized, is illustrated in preferred form in the accompanying drawing wherein;

Fig. 1 is a side elevational view of a device constructed in accordance with my invention and illustrating a portion of the tire in place in dot and dash lines; and Fig. 2 is an end elevational view looking toward the right in Fig. 1.

The device comprises a pair of side members 3 of substantially U-shape mounted in inverted position so that the legs 4 of the U constitute the legs of the support, the members being preferably constructed of tubular metal. The leg portions 4 flare outwardly as shown in the drawing so as to give good support and to prevent tilting of the device in use.

The side members 3 are connected together by means of rods 5 and 6 carrying tubular members or sleeves 7 which may act as spacer members for maintaining the side members in spaced relation. In addition braces or tie members 8 are employed toward the lower portion of the legs for connecting the side members together. The tie members 8 are attached to the leg portions 4 of the side members by means of bolts 9 fitting holes in said leg portions.

Referring to Figure 1 it is pointed out that the cross rod 6 is located at a higher point than the cross rod 5. Through this arrangement of the rods displacement of the tire supported in the device is prevented to a greater degree than if both rods were at the same elevation since the higher rod resists thrusts which would tend to cause the tire to roll over it when vulcanizing or grooving work is being done on the tire. As will be seen from Figure 1 these rods provide a saddle, so to speak, for the tire.

The rods 5 and 6 are provided at one end with heads 10 and their other end portions with a plurality of spaced holes 11 as shown in Fig. 2. These holes provide for adjustment of the device to accommodate tires of different width by inserting cotter pins 12 in the holes corresponding to the width of adjustment desired. The heads 10 and the cotter pins 12 prevent lateral displacement of the frame members 3 outwardly and the sleeves 7 prevent lateral displacement inwardly. The sleeves 7 also act as rollers on which the tire being worked on may be rolled around. If desired a plurality of sleeves 7 of different lengths corresponding to the adjustments provided by the spaced holes 11 may be employed so that the sleeves will act as spacers in each adjustment of the device. However I also contemplate employing only one set of sleeves of minimum width in which case the tire will act to spread the members 3 when it is inserted in place.

It is to be noted that in adjusting the device as to width the members 3 pivot on the bolts 9.

In addition to the above adjustment for accommodating tires of different widths I also provide adjustment to accommodate tires of different diameters. To the accomplishment of this end I provide a plurality of holes 13 at spaced intervals for receiving the rods 5 and 6 whereby they may be positioned to best suit the diameter of tire to be supported in the device.

It will be seen from the foregoing that I have provided a very simple device for supporting tires for purposes such as vulcanizing, regrooving or the like and that stable support is provided for the tire without the use of any clamping or securing devices since it is only necessary to place the tire between the members 3 and onto the rods 5 and 6 on which the tire rests or saddles so to speak.

To disassemble the device it is only necessary to remove the cotter pins 12, then the rods 5 and 6 and then the bolts 9.

I claim:

1. A supporting device for tires comprising a pair of side members having leg portions, a plurality of apertures in the upper region of said leg portions, a cross rod fitting corresponding apertures in the corresponding leg portions of said side members and extending therebetween, a cross rod fitting corresponding apertures in the other leg portions of said side members and extending therebetween, said cross members constituting supports on which a tire placed in the device rests, and said cross rods being adapted to be inserted in other of said apertures whereby adjustment is provided to take care of tires of different diameters.

2. A supporting device for tires comprising a pair of side frame members, cross members connecting said side members and adapted to support a tire, said cross members having apertures therein adjacent one end, pins fitting said apertures for positioning said frame members, and other apertures in said cross members providing adjustment of the position of said frame members whereby adjustment of the device to accommodate tires of different widths is provided.

HOMER DEVER SALTSMAN.